United States Patent

[11] 3,582,555

[72] Inventor Jurgen Kok
Bedford, Mass.
[21] Appl. No. 716,624
[22] Filed Mar. 27, 1968
[45] Patented June 1, 1971
[73] Assignee DASA Corporation
Andover, Mass.

[54] TELEPHONE ALARM SYSTEM
6 Claims, 5 Drawing Figs.

[52] U.S. Cl. .......... 179/5, 179/90
[51] Int. Cl. .......... H04m 11/04, H04m 1/44
[50] Field of Search .......... 179/5, 90 CI, 90 B, 90 BD

[56] References Cited
UNITED STATES PATENTS

| | | | |
|---|---|---|---|
| 3,301,967 | 1/1967 | Plyer .......... | 179/90 |
| 3,427,403 | 2/1969 | Stokes et al .......... | 179/5 |
| 3,441,685 | 4/1969 | Wallace .......... | 179/90 |

*Primary Examiner*—Kathleen H. Claffy
*Assistant Examiner*—Douglas W. Olms
*Attorneys*—Joseph Weingarten and Philip J. McFarland

ABSTRACT: An alarm system for automatically dialing a predetermined number in response to an emergency event and, upon connection with the called station, transmitting an emergency message to the called station. Number and message generation is accomplished by logic circuitry associated with appropriate telephone signal generators.

INVENTOR.
JURGEN KOK
BY Joseph Weingarten
Stanley M. Schurgin
ATTORNEYS

INVENTOR.
JURGEN KOK
BY Joseph Weingarten
Stanley M. Schurgin
ATTORNEYS

TELEPHONE ALARM SYSTEM

FIELD OF THE INVENTION

This invention relates to alarm systems for transmitting information over telephone lines, and more particularly to circuitry for generating number and message information in such systems.

BACKGROUND OF THE INVENTION

Alarm systems are known for transmitting emergency messages over a telephone line. In general, upon the occurrence of an alarm, for example a fire alarm, the system seizes the telephone line, whether or not the local telephone instrument is being used, and the system automatically dials a predetermined telephone number and, upon connection with the called station, institutes a suitable message to notify the called station of the detected emergency. One such system is described in copending application Ser. No. 625,430, filed Mar. 23, 1967 and assigned to the assignee of the present invention. The system described in the copending application is operative to transmit emergency information without rendering telephone lines unusable for inordinate periods of time, and without unduly disrupting normal telephone service. Upon the occurrence of an emergency event, the automatic alarm system disconnects the local telephone instrument, seizes the telephone line, and responds to operational signals produced in the telephone system to make connection with a preselected station, and then responds to control signals generated by the called station to send the emergency message. After the emergency message is received by the called station, the alarm system restores the local telephone instrument to its normally connected status. The present invention is a modification of the above-described system and contains number and message decoding circuitry which is operative in a multitone dialing system as well as a pulse dialing system.

SUMMARY OF THE INVENTION

Briefly, the system according to the invention comprises an alarm sensor control unit, timing circuit, telephone line control circuitry and number and message generation equipment. Upon receipt of a particular alarm signal by the alarm sensor control unit, a timing gate is generated which, after a predetermined time interval, activates the circuitry which automatically dials a predetermined station to notify it of the emergency condition. Upon receipt of a command signal from the called station, the preselected message is automatically transmitted to the called station and this message is repeated for several cycles to insure that it is properly received. After the message has been transmitted the requisite number of times, the alarm system is disconnected from the telephone line and the local telephone instrument is reconnected to the line. In the event that a control signal is not received from the called station, which may occur, for example, if the called station is busy, the alarm system will wait a predetermined time interval and then attempt to redial the number. In this manner the alarm system will continue to automatically dial a called station to notify it of an emergency and will attempt to reach the called station until the message is received by the answering station. Once the emergency event is reported by the alarm system, however, the system is disconnected from the telephone line so as not to monopolize the line which may be needed for other purposes. The system is operative with a multitone dialing system or a pulse dialing system and is capable of activation each time an alarm is triggered.

BRIEF DESCRIPTION OF THE DRAWINGS

The invention will be more fully understood from the following detailed description taken in conjunction with the accompanying drawings, wherein.

DETAILED DESCRIPTION OF THE INVENTION

Figure 1:
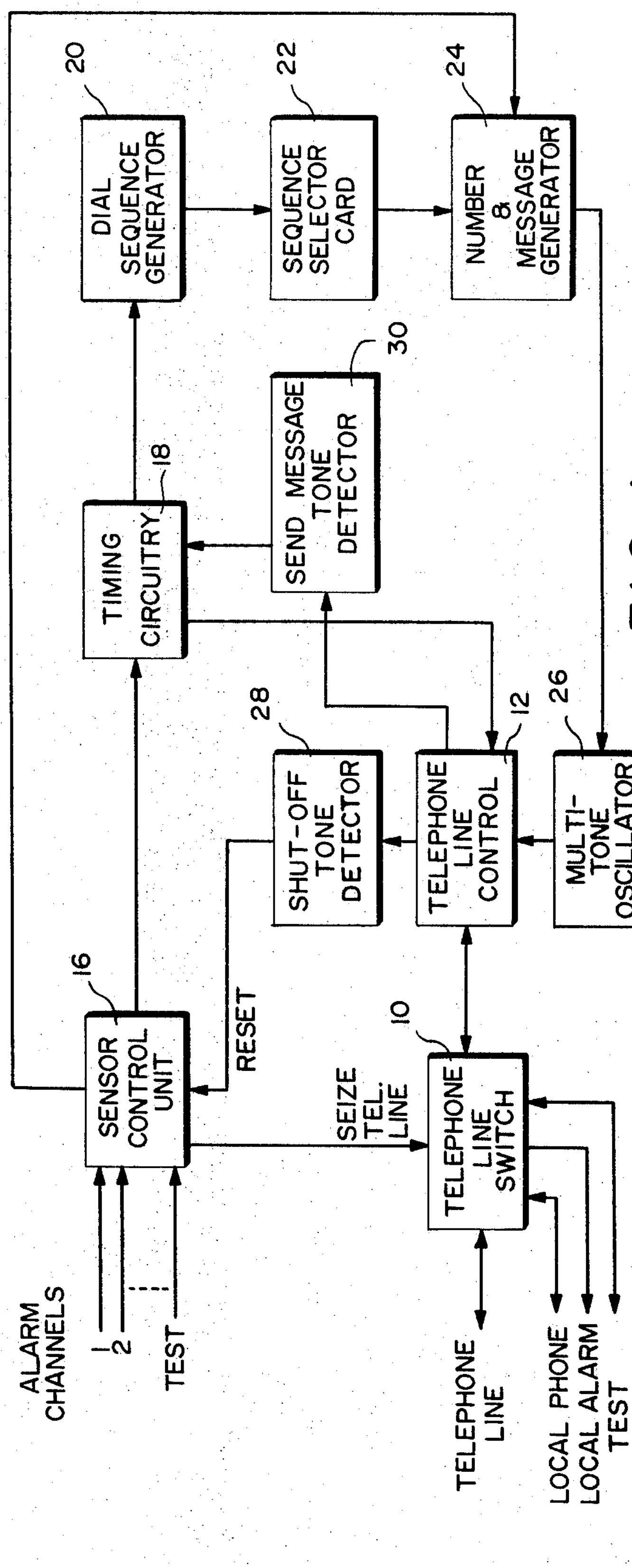
FIG. 1 is a block diagram of an alarm system according to the invention.

Referring to FIG. 1, there is shown a telephone line switch 10 which is connected to a conventional telephone line and which is also connected to a local phone, a local alarm, if desired, and to a test jack which is useful to verify the operability of the system. The line switch 10 is also connected to a telephone line control 12. One or more alarm channels connected to appropriate sensing transducers are connected to sensor control unit 16, one output of which is connected to timing circuitry 18 which, in turn, is connected to a dial sequence generator 20 and to telephone line control 12. Timing circuitry 18 typically is a well known bootstrap timer wherein a ramp voltage triggers threshold devices at predetermined times to provide system timing signals. Dial sequence generator 20 is connected to a sequence selector 22 which is connected to a number and message generator 24 which, in turn, is connected to a multitone oscillator 26 connected to line control 12. Line control 12 is also connected to a "shutoff" tone detector 28, the output of which applies a reset pulse to sensor control unit 16. A "send message" tone detector 30 receives an enabling signal from line control 12 to initiate the dial sequence in dial sequence generator 20.

In operation, upon receipt of an alarm signal from one of the alarm transducers, sensor control unit 16 disconnects the local phone by means of telephone line switch 10 so that the alarm system can be operationally connected to the telephone line whether or not the local phone was in use at the time of occurrence of the emergency. Sensor control unit 16 also provides a signal to timing circuitry 18 which provides a time delay of, typically, 3 seconds, and then applies a signal to telephone line control 12 which causes telephone line switch 10 to switch to the off-hook condition, thereby connecting the system to the telephone line. Timing circuitry 18 now applies a signal to dial sequence generator 20 which provides as an output a train of time sequential signals. These sequential signals are applied to sequence selector card 22 which is operative to encode the signals into a predetermined order representative of a telephone number to be automatically dialed. The encoded signals suitably energize generator 24 which appropriately energizes multitone oscillator 26 which, in turn, provides the requisite dual frequency tones to telephone line control 12. Line control 12 then applies the frequency-coded telephone number through line switch 10 to the telephone line for transmission to the central station.

The called station, upon energization by the calling number from the alarm system via the telephone central station transmits back to the alarm system a "send-message" signal which, typically, is a tone burst of a predetermined frequency. This send-message signal is received by the alarm system and transmitted through line switch 10 and line control 12 to a send-message tone detector 30 which applies, in response to the send-message signal, an energizing signal to dial sequence generator 20. When thus energized by the send-message signal, sequence generator 20 applies a time sequential signal train to sequence selector 22 which activates the message generation portion of number and message generator 24. Message generator 24 generates a coded signal representing the address of the particular alarm system, while a coded signal representing the type of emergency is derived from the sensor control unit 16. Multitone oscillator 26 provides, in response to the coded message signal, a multifrequency signal representative of the message to be transmitted, and this message is transmitted by way of line control 12 and line switch 10 over the telephone line to the called station. To insure that a correct message is received by the called station, the emergency message is usually repeated a predetermined number of times. Each time a message is received by the called station, the station transmits to the alarm system the send-message signal to recycle the generation of the message by the alarm system for repeated transmission to the called station. The time during which the message may be repeatedly transmitted is governed by timing circuitry 18, which provides a time interval gate of, typically, 30 seconds, commencing upon receipt of a send-message signal from the called station, after which interval the dial sequence generator 20 is turned off.

In the event that a send-message command is not received from the called station, which would be occasioned for example by a wrong number being dialed or the called station being busy, timing circuitry 18 generates an interval gate of typically 10 seconds, after which telephone line switch 10 is returned to the onhook condition. A further interval gate of about 25 seconds is generated after which line switch 10 is returned to the off-hook condition and the message sequence commences once more in an attempt to reach the called station. In this manner the alarm system automatically redials the called station if initially the called station is not reached, so that the emergency message will be transmitted once connection can be made to the called station.

Figure 3:
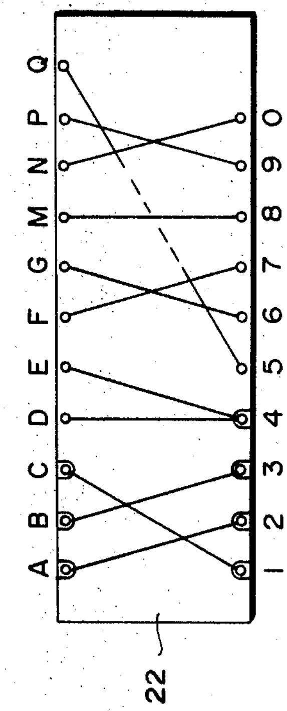
FIG. 3 is a schematic representation of a sequence selector card employed in the system of FIG. 1.
Figure 4:
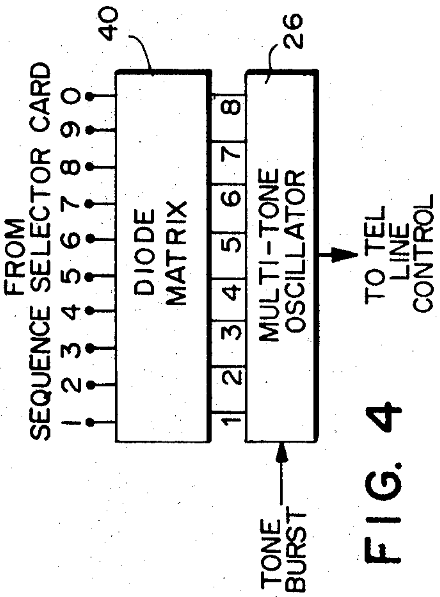
FIG. 4 is a block diagram of the number and message generator of FIG. 1.
Figure 2:
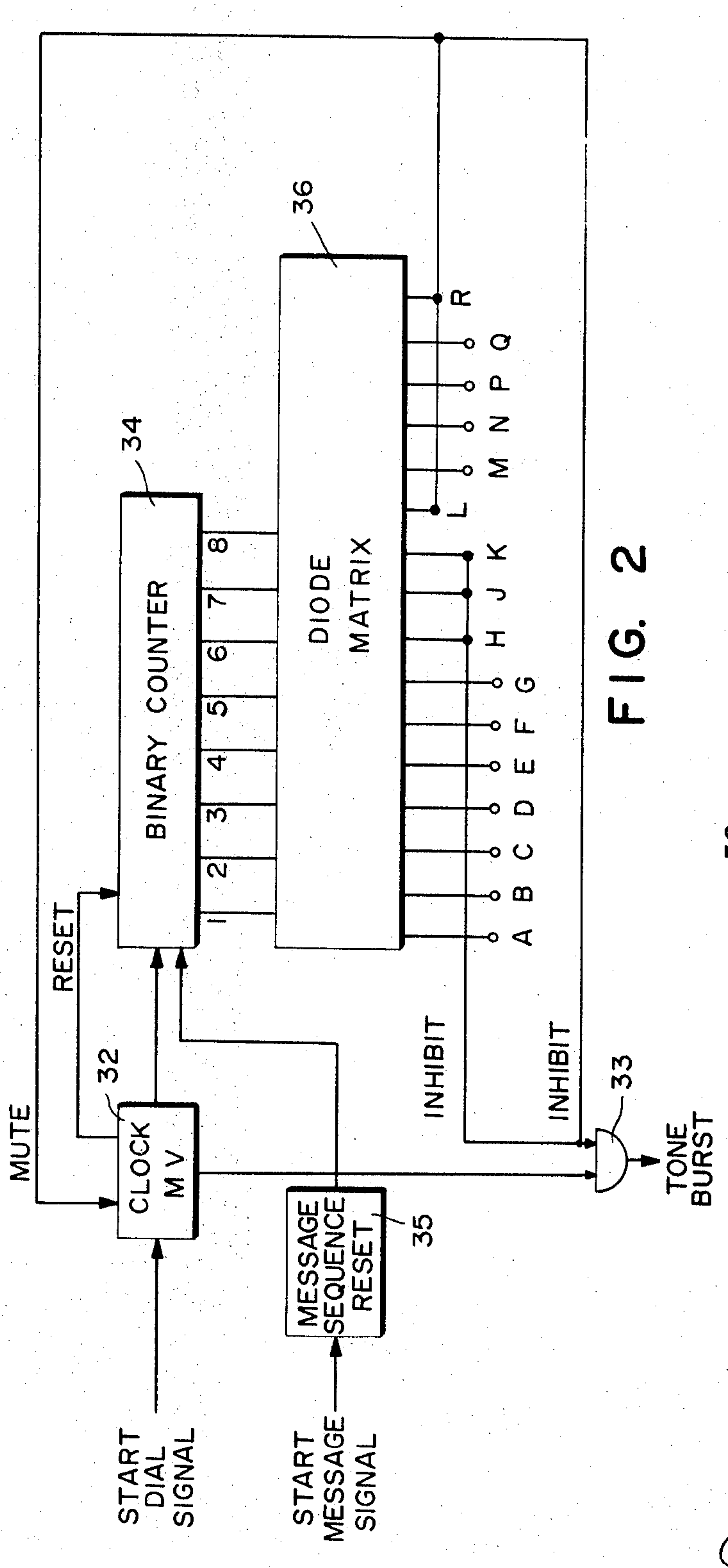
FIG. 2 is a block diagram of number and message generation circuitry employed in the system of FIG. 1.

The number and message generation circuitry is shown in greater detail in FIGS. 2, 3 and 4 and consists of a clock multivibrator 32, a binary counter 34 connected to the input of a diode matrix 36, the output of which is connected through a wired program board 22 (FIG. 3) to the input of a second diode matrix 40 (FIG. 4), whose output is connected to multitone oscillator 26.

Clock multivibrator 32 is energized by a start-dial signal from timing circuitry 18 and provides a pair of clock signals which are 180° out of phase with respect to each other. One clock signal is applied to binary counter 34 which has eight output lines, the binary counter 34 being operative in response to the clock signals to provide successively increasing binary counts in the well-known manner. The other clock output is applied to a gate 33 which provides a tone burst to the multitone oscillator for reasons which will be explained hereinafter. An inhibit signal is derived from output lines H, J, K, L and R of diode matrix 36 and is applied to gate 33 to inhibit the tone burst at selected times during the system operation, as will be further explained.

The operation of the system to generate a telephone number and an emergency message will now be explained in conjunction with FIGS. 2, 3 and 4. Initially, the circuitry is deenergized in the absence of an alarm. When an alarm sensor is triggered by an alarm condition, binary counter 34 is activated to a reset condition by a reset pulse generated by clock 32 and a predetermined time later, typically 3 seconds, a start-dial signal is applied to clock 32. Binary counter 34 can be implemented in any one of many well known ways; typically, the counter includes four flip-flops each having a pair of complementary output lines. Thus a four-stage counter has eight output lines arranged in four complementary pairs. In response to clock signals, the counter is operative to provide binary output signals of increasing binary value in response to successive clock pulses.

When a start-dial signal is applied to clock 32, the clock commences its generation of timing pulses, one train of pulses being applied to binary counter 34 and the second train of pulses being applied to gate 33. Binary counter 34 generates a sequence of binary signals which are applied to diode matrix 36. The matrix has eight input lines and 16 output lines and these lines are interconnected in a well-known manner such that binary numbers applied to the matrix input cause corresponding output signals to appear on selected ones of the matrix output lines. The matrix is arranged to provide signals sequentially on output lines A through R in response to binary inputs of increasing value. Thus, as the counter continues its binary count, matrix 36 provides output signals on successive output lines. For example, a binary count of 0 0 0 0 produced by counter 34 causes an output to appear on matrix line R; a binary count of 1 0 0 0 causes matrix line A to be energized; while a count of 0 1 0 0 causes line B to be energized. In like manner, increasing binary input numbers cause successive output lines to be energized.

In the illustrated embodiment, the sequential signals appearing on matrix lines A through G are employed to generate a seven-digit telephone number of a station to be called in the event of an emergency. The sequence of signals appearing on lines A through G are applied to a sequence selector card 22 which transposes the sequence into an order corresponding to the number to be dialed.

The 10 outputs from the sequence selector card are applied to corresponding inputs of a second diode matrix 40, the eight outputs of which are connected to multitone oscillator 26. Diode matrix 40 is operative to provide a pair of output signals on selected pairs of output lines in response to respective input signals applied to respective ones of the matrix input lines. Each pair of signals from matrix 40 is operative to suitably energize oscillator 26 to produce respective multitone oscillations representative of each corresponding telephone digit. Multitone oscillator 26 is a standard item of telephone equipment which generates combinations of two out of eight frequencies which represent the 10 telephone digits. The oscillator, therefore, need not be discussed in detail herein. In brief, a current is caused to flow through a plurality of tuned coils and when a tone burst is applied to the tuned circuits in conjunction with a signal which selects a predetermined pair of tuned circuits, the current is rapidly turned off so that the selected coils oscillate at selected frequencies. The tones are transmitted over the telephone line to the telephone central exchange to conduct proper switching operations in a well-known manner.

Turning now to FIG. 2, output lines A through G of matrix 36 provide seven sequential signals for generation of a seven-digit telephone number. Output lines H, J and K are supplementary terminals which may be used if area or access codes are to be dialed by the signal generator. For the standard seven-digit telephone number, these terminals are not used and are therefore connected together to provide an inhibit signal to gate 33 to prevent stray oscillations by oscillator 26. Lines L and R are also connected together to provide an inhibit signal to gate 33 as well as stopping clock 32 at predetermined times, as will be explained hereinafter. Lines M, N, P and Q provide sequential signals for the generation of the emergency message. In the present embodiment, lines M, N and P provide signals representing the address of the calling station and the final digit of the message represents the emergency condition being reported. The emergency condition digit is generated by sensor control unit 16 in response to the actuated alarm and this digit is interposed into the message when line Q is activated. Referring to FIG. 3, the connecting wire between terminal Q and terminal 5 is shown broken to indicate that it is not connected directly between these terminals but rather passes through other apparatus, namely the sensor control unit 16.

One complete operating sequence of the system will now be described. Initially counter 34 and the associated apparatus is in a standby condition. Actuation of a particular alarm sensor, say a fire alarm, causes sensor control unit 16 to provide a start-timing signal to timing circuitry 18 which, in turn, provides a start-dial signal to clock 32 which causes binary counter 34 to commence its counting sequence. Output lines A through G of matrix 36 are sequentially activated in response to respective counts of counter 34. These sequentially activated lines A through G are transposed by sequence selector card 22 into a digit sequence corresponding to the number of the station to be called. In the illustrated sequence selector card of FIG. 3, the called number is 231–4476. The properly assembled number is sequentially applied to diode matrix 40 which, in turn, causes the corresponding dual tones to be produced by oscillator 26, which tones are transmitted to the telephone central station which in a well-known manner rings the called station.

The eighth, ninth and 10th counts of counter 34 activate diode matrix lines H, J and K, which are connected together to provide an inhibit signal to gate 33 to prevent a tone burst from being applied to oscillator 26. This inhibit signal prevents stray oscillations in oscillator 26 which may cause an error in a number being called or otherwise detract from proper system operation. The 11 count of counter 34 energizes matrix line L which also inhibits gate 33, as well as muting clock 32 to discontinue operation of the counter. The digit generator is now in a standby condition and will not generate any further signals until a start-message signal is received or until a predetermined time interval has elapsed without receipt of such start-message signal, in which event the called number will be redialed. The start-message signal is received from the called station and this signal is applied to message sequence reset 35 which is operative to set binary counter 34 to a count of 12 which causes activation of matrix line M, the binary counter now continuing its sequential operation to sequentially energize lines N, P and Q. The signal sequence M, N, P, Q is transposed by sequence selector card 22 into the proper coded format representing the emergency message, in this case the encoded digit being 8095. The first three digits, 809, represent the address of the calling station, while the last digit, digit 5, represents the particular alarm condition; in the present case, a fire alarm. The emergency message is applied to diode matrix 40 which is operative to provide the corresponding multiple tones for transmission to the called station. The 16 count of counter 34 activates matrix line R which causes an inhibit signal to be applied to gate 33 and a muting signal to be applied once more to clock 32, again placing the digit generator in a standby condition. A further start-dial or start-message signal will again cause sequential operation as described above.

Figure 5:
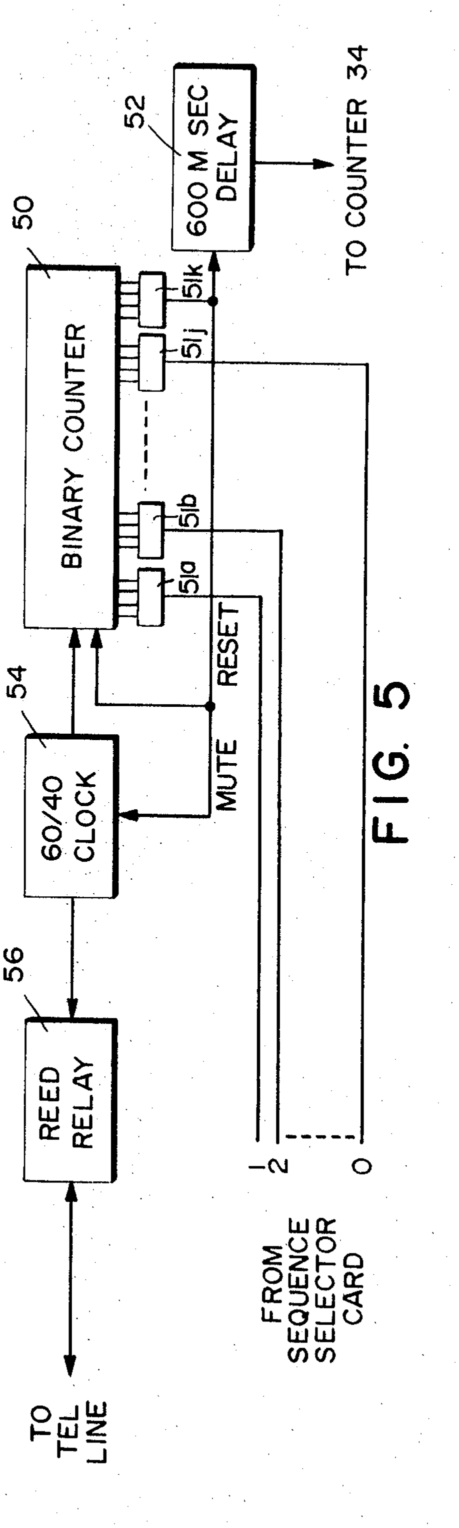
FIG. 5 is a block diagram of an alternative embodiment of dialing circuitry useful in the present invention.

The system described thus far employs a multitone oscillator to generate frequency coded representations of telephone digits as used, for example, in the TOUCH-TONE dialing system of the American Telephone & Telegraph Company. The invention is also capable of providing pulse dialing information when used in conjunction with a pulse dialing telephone system. In such a pulse dialing system, the multitone oscillator 26 and the number and message generator 24 can be modified by the system of FIG. 5. Referring to FIG. 5, there is shown a binary counter 50, a plurality of preset gates **51*a* through 51*j* and a stop gate 51*k*, a 600 millisecond delay 52, a clock 54 and a reed relay 56. Preset gates 51*a* through 51*j* are each connected to respective terminals 1 through 0 of sequence selector card 22. Stop gate 51*k* is connected to the input of delay 52, the output of which is applied to counter 34 of the dial sequence generator. Gate 51*k* is also connected to the reset input of counter 50 and to a muting terminal of clock 54**.

The binary counter 50, as counter 34, typically comprises four flip-flops interconnected to provide four output signals which represent four bit binary numbers. The binary numbers are of increasing binary value with successive clock pulses. Each preset gate **51*a*—51*j* is operative to set counter 50 to a predetermined count from which the counter will cycle in response to clock 54 back to a reset condition, that is, a binary count of 0 0 0 0, at which time clock 54** is placed in a standby state.

The table below shows the binary count preset into counter 50 by each respective signal from the sequence selector card, each signal representing a digit of a telephone number.

In operation, a sequence of digits from selector card 22 is applied to corresponding gates **51*a*—51*j* to cause counter 50 to allow clock 54 to produce pulse trains representative of the digits of the number to be dialed. Each preset counter condition is chosen to provide the requisite number of clock cycles necessary to dial a particular digit. For example, when preset gate 51*a* is energized by a signal on input line 1, the counter is set to binary number 1 1 1 1 and cycles through one counting operation to count 0 0 0 0, at which time stop gate 51*k* provides a signal which stops clock 54. Thus clock 54 generates one pulse period, causing reed relay 56 to open and close once, thereby transmitting a "one" pulse over the telephone line to a called station. Clock 54 generates the conventional 60/40 telephone pulse format; that is, a pulse having a duration of 60 milliseconds and a rest period of 40 milliseconds before generation of the next pulse. The delay 52 provides the necessary 600 millisecond interdigital time required for telephone central station operation. More particularly, the signal from gate 51*k*, after the 600 millisecond delay, is applied to binary counter 34** of the dial sequence generator to cause generation of the next sequence step.

| Digit | Preset gate | Binary count |
|---|---|---|
| 1 | 51*a* | 1 1 1 1 |
| 2 | 51*b* | 0 1 1 1 |
| 3 | 51*c* | 1 0 1 1 |
| 4 | 51*d* | 0 0 1 1 |
| 5 | 51*e* | 1 1 0 1 |
| 6 | 51*f* | 0 1 0 1 |
| 7 | 51*g* | 1 0 0 1 |
| 8 | 51*h* | 0 0 0 1 |
| 9 | 51*i* | 1 1 1 0 |
| 0 | 51*j* | 0 1 1 0 |

By reason of certain limitations in commercial telephone systems in transmitting pulse data on voice lines, it is sometimes desirable to combine the pulse dialing and multitone embodiments of the invention. In such a combined implementation, the number is dialed in pulse form while the message is sent in multitone form. In this implementation, the telephone number portion of the sequence selector card is connected to the pulse circuitry of FIG. 5 to generate the telephone number digits, while the message portion of the sequence selector card is connected to the requisite inputs of matrix 40 to generate a multitone version of the message.

It should be evident that the encoding of a number and message can be accomplished in other than the illustrated manner. For example, the same outputs of the counter can be used for both number and message, with the message generation logic and number generation logic being activated by suitable gating means. In addition, the matrix lines can be encoded in other than the manner shown to suit particular operating requirements. It should also be evident that the present system can be employed to detect other than emergency events; it can, in general, be used to detect any condition denoted by an actuated sensor such as in the process monitoring and control field. Accordingly, the invention is not to be limited to what has been particularly shown and described, except as indicated in the appended claims.

I claim:

1. An alarm signaling system for calling a predetermined telephone station and transmitting thereto a coded message indicative of an alarm condition as detected by a sensor coupled to the system, said system comprising:

control means operative in response to actuation of a sensor to seize a telephone line and connect the alarm signaling system thereto;

a signal generator having a first portion for producing telephone calling signals and a second portion for producing coded message signals and including means for generating a sequence of binary numbers; and means for converting said sequence of binary numbers into a first sequence of signals representing the telephone number of a station to be called, and a second sequence of signals representing a message to be transmitted to said called station;

timing means operative in response to a signal from said control means to energize the first portion of said signal generator, thereby causing telephone calling signals to be transmitted on said telephone line;

detector means operative in response to a first signal transmitted by a called station to energize the second portion of said signal generator, thereby causing message signals to be transmitted on said telephone line; and means operative in response to a second signal transmitted by a called station to reset said control means and to disconnect the system from the telephone line, thereby placing the system in a condition to receive further alarm signals and rendering the telephone line available for other purposes.

2. An alarm signaling system for calling a predetermined telephone station and transmitting thereto a coded message indicative of an alarm condition as detected by a sensor coupled to the system, said system comprising:

control means operative in response to actuation of a sensor to seize a telephone line and connect the alarm signaling system thereto;

a signal generator having a first portion for producing telephone calling signals and a second portion for producing coded message signals;

timing means operative in response to a signal from said control means to energize the first portion of said signal generator, thereby causing telephone calling signals to be transmitted on said telephone line;

detector means operative in response to a first signal transmitted by a called station to energize the second portion of said signal generator, thereby causing message signals to be transmitted on said telephone line; and means operative in response to a second signal transmitted by a called station to reset said control means and to disconnect the system from the telephone line, thereby placing the system in a condition to receive further alarm signals and rendering the telephone line available for other purposes;

said signal generator including a binary counter operative to provide a sequence of binary output signals of increasing binary value;

a first diode matrix having a plurality of inputs connected to the outputs of said binary counter, and a plurality of matrix outputs, said matrix being operative to produce an output signal on successive ones of said matrix outputs in response to increasing binary counts from said counter;

means for transposing the sequence of output signals from said matrix into a predetermined order representing a telephone number and message; and means operative in response to said transposed sequence signals to provide signals of a form suitable to dial a predetermined telephone number.

3. A system according to claim 2 wherein said means operative in response to said transposed sequence signals is a second diode matrix.

4. A system according to claim 2 further including a clock adapted to generate telephone system compatible dial pulses, and logic circuitry connected to said clock and operative in response to the output signals from said last-mentioned means to cause said clock to produce dial pulses representing a predetermined telephone number.

5. A system according to claim 3 further including a multitone oscillator operative in response to the signals from said second diode matrix to provide dual frequency tones of a form to call a predetermined telephone number.

6. A system according to claim 1 further including means operative a predetermined time after the absence of a first signal from said called station to again energize the first portion of said signal generator to cause telephone calling signals to again be transmitted on said telephone line.